July 23, 1957   C. F. ARNOLD ET AL   2,800,068
HEATING, VENTILATING, AND WINDSHIELD DEFROSTING APPARATUS
Filed Nov. 6, 1952   7 Sheets-Sheet 1

Inventors
Charles F. Arnold &
By John Ralph Holmes
Willits, Helwig & Baillio
Attorneys

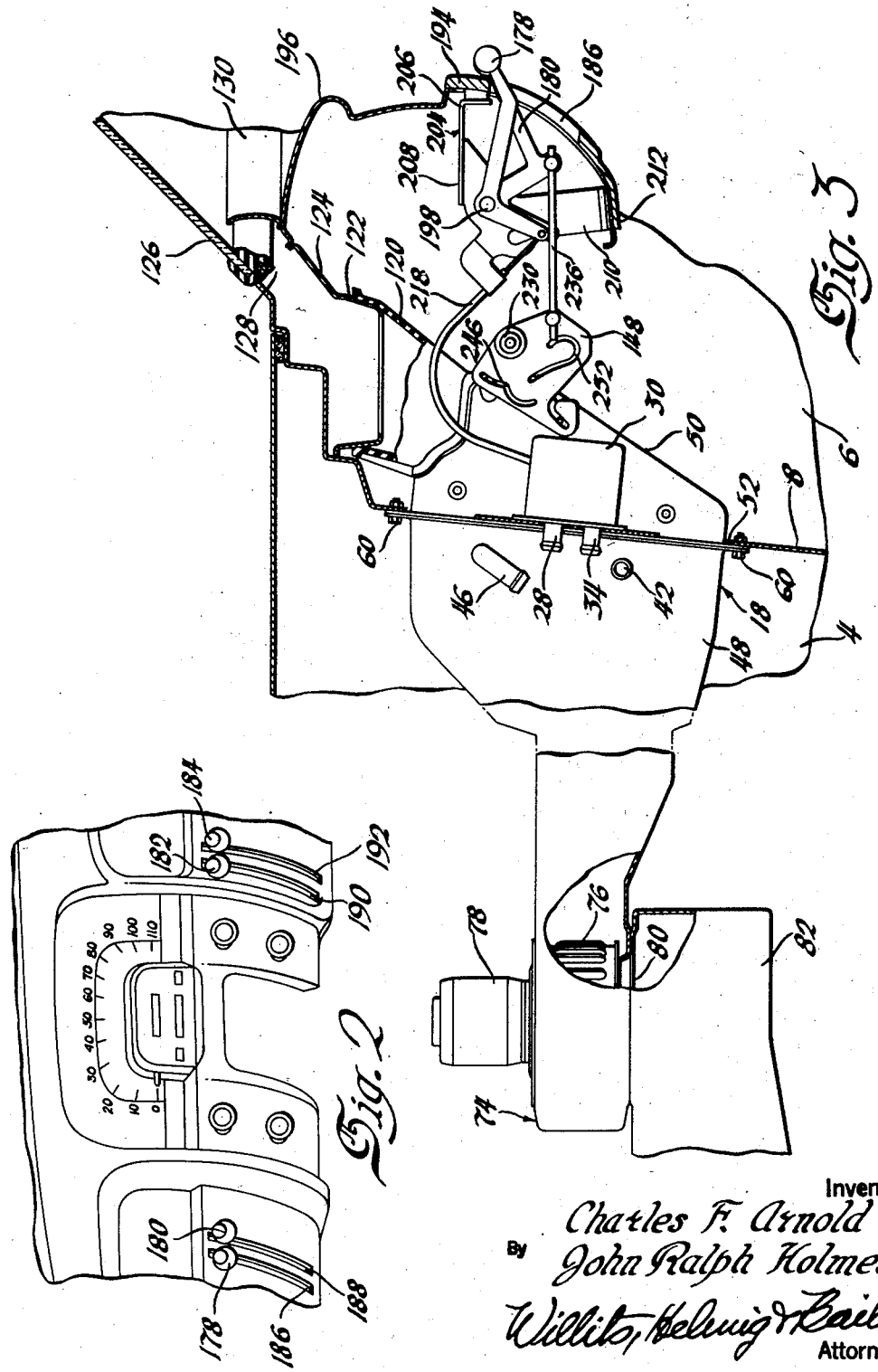

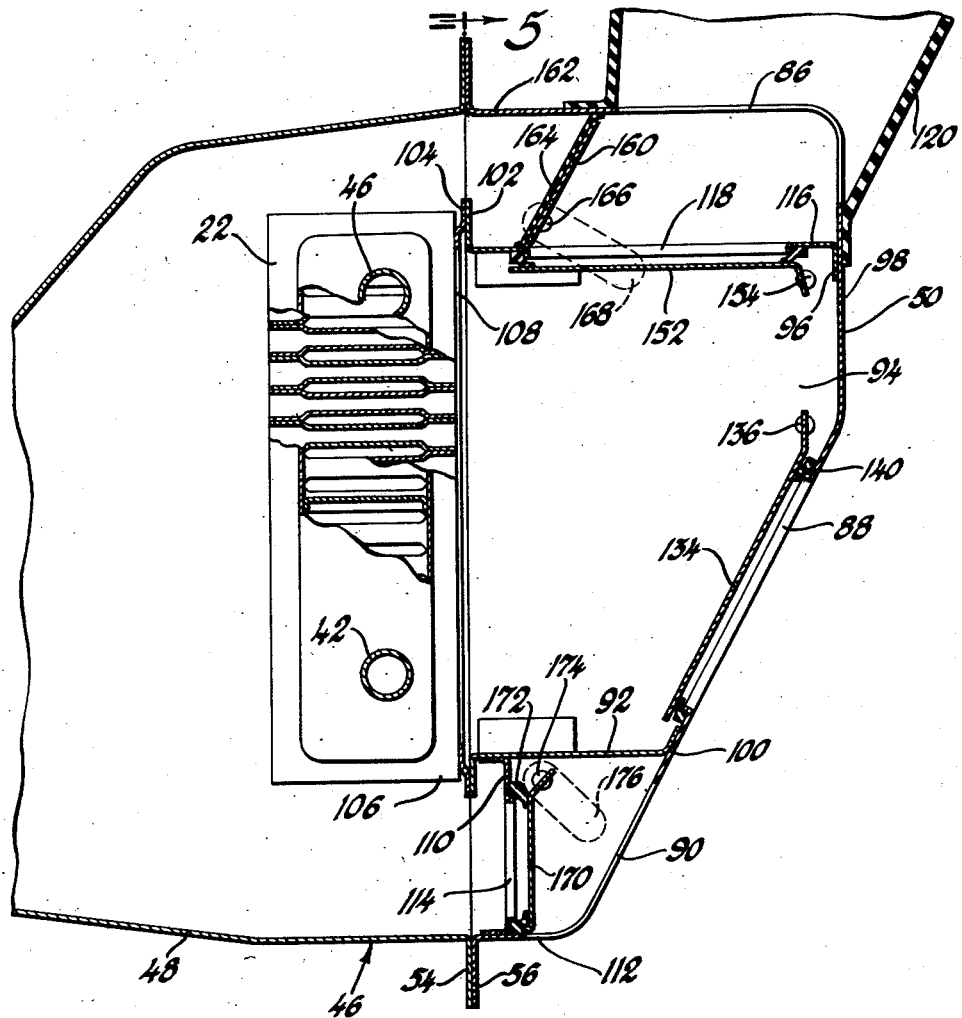

July 23, 1957  C. F. ARNOLD ET AL  2,800,068
HEATING, VENTILATING, AND WINDSHIELD DEFROSTING APPARATUS
Filed Nov. 6, 1952  7 Sheets-Sheet 4

Inventors
Charles F. Arnold &
By John Ralph Holmes
Willits, Helmig & Baillio
Attorneys

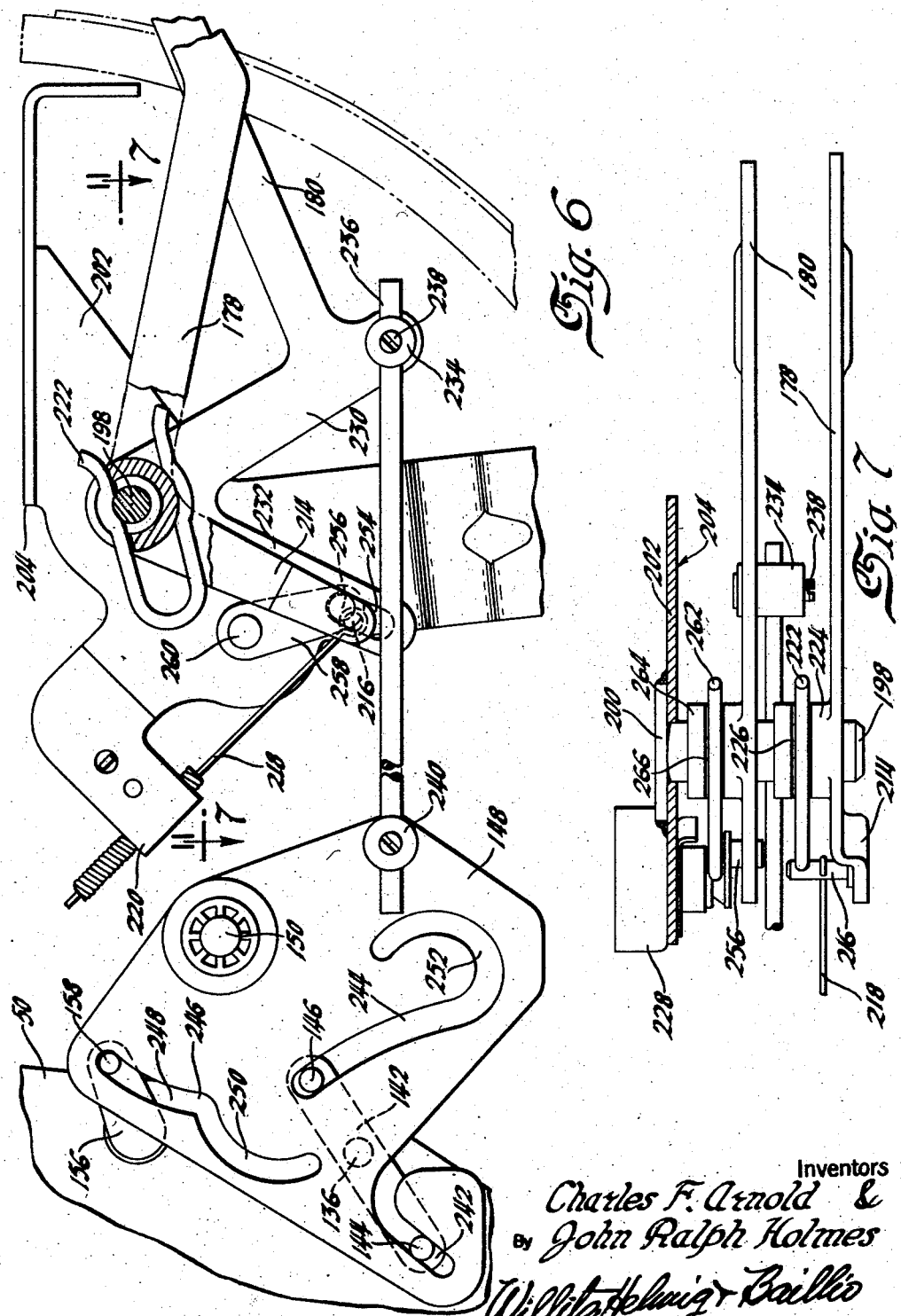

July 23, 1957 C. F. ARNOLD ET AL 2,800,068
HEATING, VENTILATING, AND WINDSHIELD DEFROSTING APPARATUS
Filed Nov. 6, 1952 7 Sheets-Sheet 6

Inventors
Charles F. Arnold &
By John Ralph Holmes
Willits, Helwig & Baillio
Attorneys

United States Patent Office 2,800,068
Patented July 23, 1957

2,800,068

HEATING, VENTILATING, AND WINDSHIELD DEFROSTING APPARATUS

Charles F. Arnold, Detroit, Mich., and John R. Holmes, Lockport, N. Y., assignors to General Motors Corporation, Detroit, Mich., a corporation of Delaware Application November 6, 1952, Serial No. 318,988

7 Claims. (Cl. 98—2)

This invention relates to heating, ventilating and windshield defrosting apparatus for use, particularly in motor vehicles.

The present invention contemplates certain improvements over existing apparatus for heating and ventilating an automotive vehicle. Present day requirements demand heating and ventilating apparatus capable of so controlling the temperature at the interior of a vehicle as to insure maximum comfort during all the seasons of the year. Most apparatus of this character now in use either fail to provide the degree of control required or are expensive and complicated and therefore impracticable for general use.

One object of the present invention is to provide heating, ventilating and windshield defrosting apparatus which is capable of efficiently performing the required functions and yet is simple in construction and inexpensive in manufacture.

Another object is to provide in apparatus of the stated character novel control means wherein a single member controls the sequence of operation of heating and windshield defrosting valves whereby proper adjustment thereof may be made with a minimum of distraction of the operator while driving a vehicle.

A still further object is to provide apparatus of the stated character which is capable of distributing both heated and unheated air to different parts of the vehicle at the same time.

A still further object is to provide in apparatus of the stated character a novel arrangement of control mechanisms for controlling the distribution, quantity and temperature of the air entering the passenger compartment of a vehicle.

Other and further objects will become apparent as the description of the invention progresses.

Of the drawings:

Figure 2 is a fragmentary elevational view of a portion of the instrument panel showing the arrangement of the control levers associated with the apparatus comprising the present invention.

Figure 3 is a longitudinal sectional view taken through the front portion of a vehicle showing the structure and arrangement of the apparatus, shown in Figure 1, certain parts being broken away to more clearly show certain features thereof, said view being taken substantially along line 3—3 of Figure 1.

Figure 4 is a sectional elevational view of the air heating and distributing casing of the apparatus showing the arrangement of the heating core and of the various control valves associated therewith, certain parts being broken away to more clearly show certain features thereof.

Figure 6 is a side elevational view of a portion of the control mechanism for controlling the operation of certain adjustable parts of the apparatus.

Figure 7 is a plan view, partly in section, of the mechanism shown in Figure 6, said view being taken substantially along line 7—7 of Figure 6.

Figure 1:
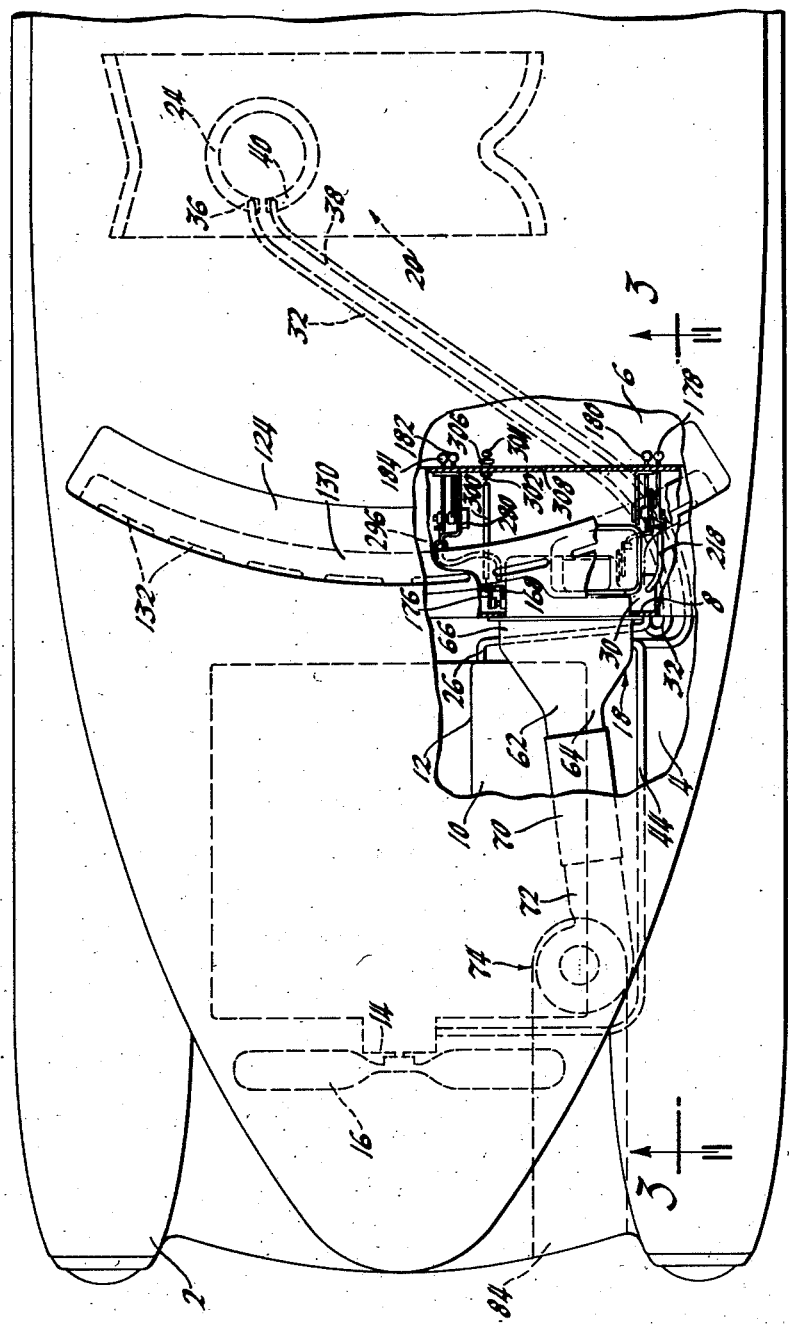
Figure 1 is a plan view of the front portion of an automotive vehicle showing the arrangement of the heating, ventilating, and defrosting apparatus comprising the present invention, certain parts being broken away to more clearly show certain features thereof.

Referring to the drawings, and particularly to Figure 1 thereof the numeral 2 designates generally a motor vehicle having an engine compartment 4 and a passenger compartment 6 disposed at opposite sides of a dash or fire wall 8. An internal combustion engine 10 which may be of the usual V-type construction is mounted in the usual manner in engine compartment 4 and has associated therewith a jacket 12 for a liquid cooling medium which is circulated therefrom to a radiator, not shown, by a circulating pump indicated generally at 14. A fan 16 operatively connected to the crank shaft 12 by mechanism, not shown, functions to draw air through the radiator to cool the liquid circulating therein in the usual fashion. The pump 14 may also be connected to the crank shaft in a well-known fashion. Front and rear heating units indicated generally at 18 and 20, respectively, are provided, the former being secured to the dash wall 8 while the latter is mounted beneath the front seat of the vehicle and functions to direct heated air to the portion of compartment 6 disposed to the rear of the front seat. Front and rear heating units 18 and 20 are provided with heating cores 22 and 24, respectively. As shown more particularly in Figure 1, a pipe connection 26 is connected at one end to the upper end of jacket 12 and at the other end to thermostatically controlled valve mechanism indicated generally at 30. A second pipe connection 32 connects the lower fitting 34 of thermostatically controlled valve mechanism 30 to the inlet end 36 of heating core 24 for the rear heating unit 20. A return pipe connection 38 connects the discharge end 40 of core 24 with the fluid inlet end 42 of the front heater core 22. A return pipe connection 44 connects the outlet fitting 46 of heating core 22 with the circulating pump 14 associated with engine 10. From the foregoing description, it is seen that heating fluid from engine 12 may enter the system through thermostatically controlled valve 30 and then flow to the heating core 24 of the rear unit 30 and then return and circulate through the front heater core 20 from which it returns to the coolant circulating system of engine 10. The rear heating unit 20 is of usual construction and consists of the heating core 24 having associated therewith an electric motor operated blower, not shown, which is energized upon movement of certain control means hereinafter more fully described. The specific construction of rear heating unit 20 except as associated with the apparatus in general forms no part of the present invention and for a more detailed disclosure of such a unit reference may be had to the copending United States application C. V. Crockett, Serial No. 190,136, filed October 14, 1950 and issued March 16, 1954, as Patent 2,672,294.

The front heating unit 18 comprises a casing 46 (Fig. 4) consisting of a front section 48 which extends into the engine compartment 4 and a rearwardly disposed section 50 which extends into the passenger compartment 6 through an opening 52 provided in fire wall 8. Front and rear sections 48 and 50 of the casing are provided with outwardly extending perimetral flanges 54 and 56 which may be secured together by welding or other suitable means. The flanges 54 and 56 are provided with a plurality of aligned openings 58 for receiving bolts 60 or other securing means for attaching the casing 46 to the fire wall 8. Casing section 48 is provided with a reduced substantially circular inlet end 62, an intermediate forwardly diverging portion 64 and a substantially square rearwardly disposed portion 66 which corresponds generally in shape with the forward end 68 of rear section 50. Inlet end 62 has secured thereto one end of a duct 70, the front end of which being connected to the outlet end 72 of a blower indicated generally at 74. Blower 74 comprises a rotary blower member 76 driven by an electric motor 78. Blower unit 74 is seated upon and the inlet opening thereof communicates with an opening 80 provided in a duct 82 mounted in any suitable manner in engine compartment 4 and whose open inlet end 84 is disposed near the front of vehicle 2. Accordingly, outside air entering duct 82 flows through blower 74 and into casing 46 through communicating duct 70.

Rear section 50 of casing 46 is provided with an upper opening 86 through which air may discharge for windshield defrosting purposes, an enlarged intermediate opening 88 through which heated air may discharge into compartment 6, and a lower opening 90 through which unheated air may enter the front end of passenger compartment 6. Mounted centrally of the interior of casing 50 is a second casing 92 forming a central compartment 94 for receiving the heatd air from heating unit 22. As shown more particularly in Figure 4, inner casing 92 is provided with an inwardly extending flange 96 which may be welded or otherwise secured to the substantially vertical upper wall 98 of casing section 50 and to the downwardly and forwardly inclined wall 100 thereof. The inner end of casing 94 is provided with an outwardly extending perimetral flange 102 which abuts against and is secured to an annular bracket 104 secured to and forming a mounting means for the perimetral casing or frame 106 of heating unit 22. Annular bracket 104 is provided with an enlarged opening 108 through which the heated air passing through core 22 may enter compartment 94. A channel-shaped member 110 extends across the lower end of casing section 50 and is secured to the lower wall 112 thereof by welding or other suitable means. The inner end of inner casing 92 is supported at the upper end of channel 110 and may be secured thereto by welding or other suitable means. Channel 110 has an elongated opening 114 provided therein through which unheated air may flow to discharge opening 90 of casing section 50 as will appear more fully hereinafter.

The upper wall 116 of inner casing 92 has provided therein an enlarged opening 118 through which heated air may flow to discharge opening 86 provided at the upper end of casing section 50. Casing section 50 has secured thereto and around the edge of opening 86 a flexible duct 120. The upper end of duct 120 engages the reduced lower end 122 of a duct 124 which extends transversely of the vehicle beneath windshield 126 and being of generally arcuate construction, as shown in Figure 1, to conform with the arcuate construction of said windshield. The upper end 128 of duct 124 is partially closed by a molding member 130 which, in cooperation with the windshield, defines a series of slots 132 through which air may flow upwardly along the inner surface of windshield 126.

Figure 5:
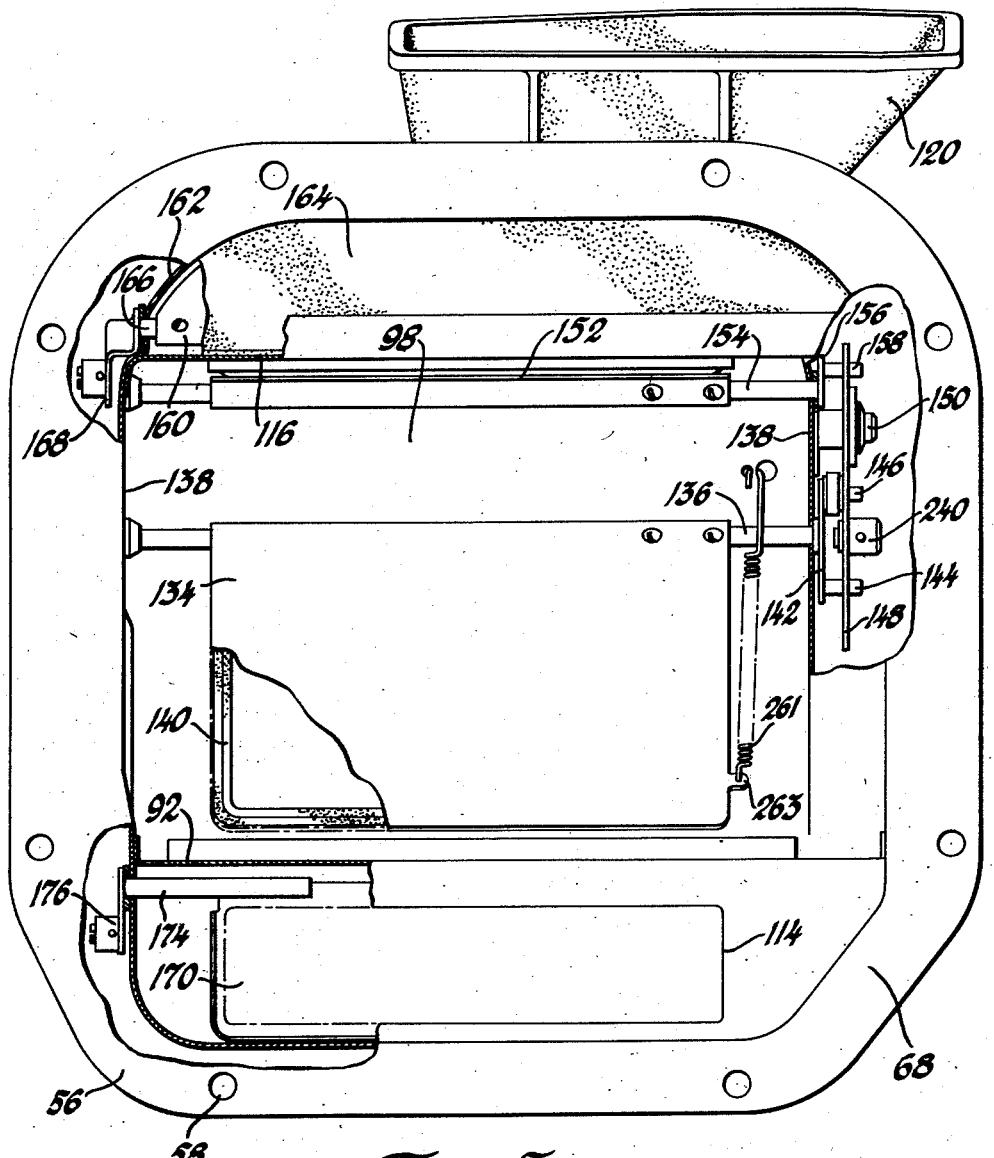
Figure 5 is a sectional elevational view looking toward the front of the casing shown in Figure 4 with parts broken away to show certain structure thereof, said view being taken substantially along line 5—5 of Figure 4.

A valve 134 mounted on a rod 136 journalled in any suitable bearings provided in the side walls 138 of casing section 50 is adapted to close discharge opening 88. A resilient seal 140 is provided around opening 88. Accordingly, when valve 134 is in the closed position, shown in Figure 4, an effective seal is provided against air leakage. One end of rod 136 has secured thereto exteriorly of wall 138 of casing section 50 an elongated operating member 142 (Figs. 5 and 6) having pin cam followers 144 and 146 secured to the opposite ends thereof, for actuation by a cam member 148 pivotally mounted on a stud 150 and secured to wall 138 of casing section 50 as will appear more fully hereinafter. Rod 136 is secured to member 142 intermediate the ends of the latter as shown in Figure 5. Opening 118 is closed by a valve 152 secured to a rod 154 also journalled in any suitable bearings provided in the side walls 138 of casing section 50. A sealing gasket 155 extends around opening 118 to prevent air leakage when valve 152 is closed. One end of rod 154 has secured thereto exteriorly of casing wall 138 an operating arm 156 having a pin cam follower 158 secured to the outer end thereof and adapted also for actuation by cam member 148 as most clearly seen in Fig. 6.

A third valve 160 is disposed between the top wall 116 of inner casing 92 and the under surface of top wall 162 of casing section 50. Valve 160 is provided with a flat, resilient sealing member 164 which extends beyond the extremities of valve 160 proper to form an effective seal against air leakage. Damper 160 is also secured to a rod 166 journalled in the side walls 138 of casing section 50 and has a crank arm 168 secured to the outer end thereof for actuation by operating mechanism hereinafter more fully described. Referring to Figure 5, it will be observed that the opposite ends of damper 160 and resilient member 164 are curved to conform with the curvature of the opening disposed between walls 116 and 162 and side walls 138.

A fourth valve 170 is mounted at the lower end of casing section 50 and is adapted to close the opening 140 provided in transverse member 110, sealing gasket 172 being provided around the edge of said opening to prevent air leakage past said valve. Valve 170 is secured to a rod 174 journalled in any suitable bearings provided in the side walls 138 of casing section 50 and has a crank arm 176 secured to the left-hand end (Fig. 5) thereof for actuation by an operating mechanism later described herein.

Referring to Fig. 2, it will be observed that four control levers, 178, 180, 182, and 184 are provided which operate, respectively, in substantially vertical slots 186, 188, 190, and 192 in the front wall 194 of instrument panel 196. Levers 178 and 180 are pivotally mounted on a rod 198 having a flat head or plate 200 (Fig. 7) secured at one end thereof which in turn is secured by welding or other means to the side wall 202 of a bracket 204. The rearwardly disposed end 206 (Fig. 3) of the top wall 208 of bracket 204 is secured in any suitable manner to the inner surface of the vertical wall 194 of instrument panel 196. A lower extension 210 of side wall 202 of bracket 204 is secured in any suitable manner to the lower inwardly extending end 212 of instrument panel 196. Bracket 204 is thus effectively held in the position shown in Figure 3. The downwardly extending arm 214 of lever 178 has secured thereto a laterally extending apertured pin member 216 to which one end of a Bowden cable 218 is secured. Bowden cable 218 is supported near its rearwardly disposed end in a clamp bracket 220, secured in any suitable fashion, to the forwardly disposed end of bracket 204. The other end of cable 218 is connected to thermostatically controlled valve 30. Thermostatically controlled valve 30 may be of any suitable construction and is so designed that upon movement of lever 178 from its uppermost position, shown in Figure 3, to a lowermost position at the end of guide slot 186, the valve associated therewith and the controls may be so adjusted to progressively increase the valve openings and thereby condition the system to increase the heat in passenger compartment 6. Inasmuch as the specific construction of this valve forms no part of the present invention, it will not be described in detail herein. For a more complete description of such a valve, reference may be had to the copending United States application of Rodney M. Johnston, Serial No. 219,655, filed April 6, 1951. Lever 178 may be held in adjusted position by means of a substantially U-shaped wire spring 222, the upper arm of which engages pin 198 and the lower arm engages the under surface of the hub 224 of lever 178. The upper portion of hub 224 is provided with a slot as shown at 226 to receive the upper arm of spring 222. Lever 178 therefore not only is frictionally held in adjusted position by the spring 22 but also is retained against axial displacement on pin 198 by the frictional engagement with the latter of the upper arm of said spring.

Lever 180 controls the operation of dampers 134 and 152 provided in casing section 50 and also controls the operation of a switch 228 (Fig. 7) which in turn controls the operation of the blower motor associated with the rear heating unit 20. The casing of switch 228 is secured to the outer surface of side wall 202 of bracket 204 in any suitable manner as by welding. Lever 180 has provided thereon in diverging relation from its pivotal mounting on pin 198 a pair of arms 230 and 232 (Fig. 6). Arm 230 has a pivotally mounted apertured bracket 234 mounted thereon for receiving one end of an operating rod 236 and a set screw 238 retaining the rod in position and allowing for axial adjustment thereof. The other end of rod 236 extends through a transverse opening provided in a second bracket 240 rotatably mounted near the rearwardly disposed end of cam plate 148. A set screw 241 prevents relative movement of rod 236 and bracket 240. Cam plate 148 has provided therein cam slots 242 and 244 which receive the pin cam followers 144 and 146, respectively, provided at the opposite ends of the plate 142 secured to the rod 136 for operating valve 134. Plate 148 also has formed therein a third cam slot 246 for receiving the pin cam follower 158 provided on the crank arm 156 secured to rod 154 for operating valve 152. The cam slots 242, 244 and 246 are so constructed that when the lever 180 is in an uppermost position of adjustment, as shown in Figures 3 and 6, both dampers 134 and 152 are in the closed position, shown more particularly in Figure 4. Upon movement of lever 180 to a position substantially intermediate the ends of guide slot 188, cams 242 and 244 operate to swing plate 142 and consequently damper 134 to fully opened position thereby causing substantially all of the air flowing through duct 70 to discharge into the passenger compartment 6 through opening 88. During this movement of cam plate 148 the upper portion 248 of cam slot 246 being substantially concentric with the pivot 150 of said plate imparts no movement to crank arm 156 and consequently to damper 152. Upon movement of lever 180 to substantially its lowermost position of adjustment the lower portion 250 of cam slot 246 swings crank arm 156 and consequently valve 152 in such a manner as to cause the latter to swing to fully open position. At the same time the portion 252 of cam slot 244 operates to actuate valve 134 to fully closed position. Substantially all of the air flowing through duct 70 and heater core 22 now flows upwardly through openings 118 and 86 and discharges through the openings 132 adjacent the windshield 126. Upon movement of lever 180 to an intermediate position between said mid and lowermost positions, valves 134 and 152 may be partially opened thereby causing some air to flow upwardly for defrosting purposes and the remainder of the air to flow through opening 88 into the vehicle. It is also seen that upon movement of lever 180 to a position between its uppermost position and its intermediate position, valve 134 only may be partially opened.

In order to insure proper operation of valve 134 a counterbalancing spring 261 is provided which as shown in Figure 5 is connected at the lower end to an ear 263 extending laterally from one end of said valve and at the upper end to the vertical wall 98 of casing section 50.

The other arm 232 of lever 180 is provided with an elongated slot 254 at the lower end thereof for receiving a laterally extending pin 256 provided at the lower end of a switch operating arm 258. Arm 258 is secured to a switch operating shaft 260 which is journalled in side wall 202 of bracket 204 and actuates the rotary switch 228 as shown more particularly in the wiring diagram in Figure 11. Upon operation of lever 180 about its pivot, arm 232 actuates arm 258 which in turn closes switch 228 to effect energization of a blower motor 328 for the rear unit 20.

As shown more particularly in Figures 6 and 7, lever 180 like the lever 178 is also held in adjusted position by a substantially U-shaped spring 262. The lower arm of spring 262 frictionally engages the under surface of the hub 264 of lever 180 while the upper arm thereof extends through a slot 266 provided in the upper portion of said hub whereby the said upper arm of the spring frictionally engages pin 198. Spring 262, accordingly, like the spring 222 frictionally resists any turning movement of lever 180 about its pivot on pin 198.

Figure 8:
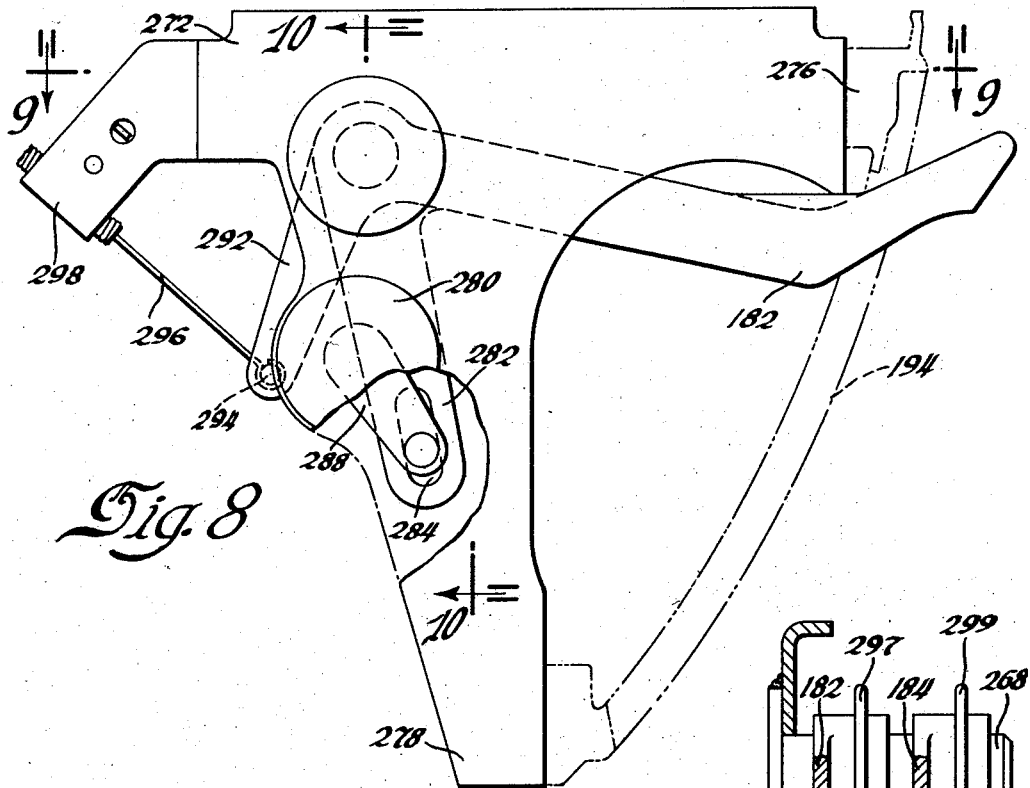
Figure 8 is a side elevational view of a second portion of the control mechanism for controlling other functions of the apparatus, certain parts being broken away to more clearly show certain features thereof.
Figure 9:
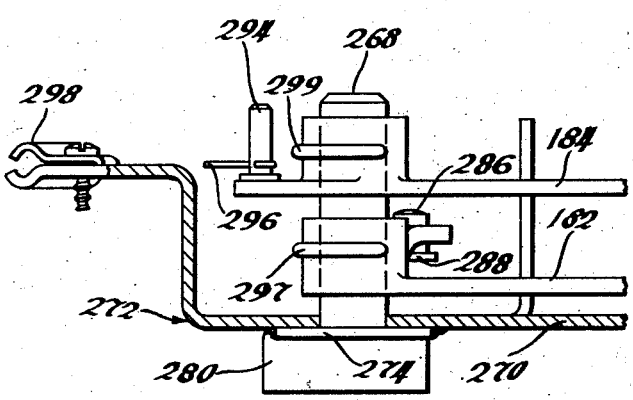
Figure 9 is a plan view, partly in section, taken substantially along line 9—9 of Figure 8.
Figure 10:
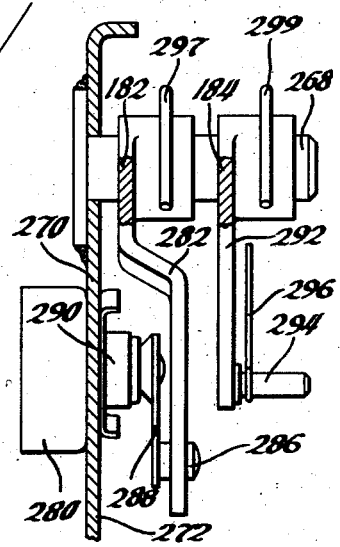
Figure 10 is a front elevational view, partly in section, taken substantially along line 10—10 of Figure 8.

Referring to Figures 8 to 10, it will be observed that control levers 182 and 184 are mounted for pivotal movement on a pin 268 secured to the side wall 270 of a second bracket 272. Pin 268 has secured to the outer end thereof a head or plate member 274 which is welded or otherwise secured to the outer surface of wall 270. Bracket 272 is secured to the substantially vertical portion 194 of instrument panel 196, as shown at 276 and 278 in Figure 8, the connections being similar to those shown at 206 and 210 in Figure 3. Lever 182 is employed to control an adjustable switch 280 attached in any suitable manner to the outer surface of bracket side wall 270. Lever 182 has secured thereto a downwardly extending arm 282 having an elongated slot 284 provided near the lower end thereof which receives a laterally extending pin 286 secured to the lower end of a switch operating arm 288. Arm 288 is secured to the switch operating shaft 290 of switch 280, shaft 290 being journalled in any suitable bearings provided in side wall 270 of bracket 272. Thus upon actuation of lever 182 switch 280 will be adjusted to different positions of adjustment, as shown more particularly in Figure 11.

Lever 184 is also pivotally mounted on pin 268 and has a downwardly extending arm 292 integral therewith. A laterally extending pin 294 is secured to the lower end of arm 292 to which one end of a Bowden cable 296 is secured. Bowden cable is supported in a clamp bracket 298 secured by any suitable means near the upper end of bracket 272. The other end of cable 296 is secured to crank arm 168 for actuating valve 160. It therefore will be observed that upon actuation of lever 184 damper 160 will be swung about its pivot to open and closed position. The hubs of lever 182 and 184 are provided with slots for receiving the upper arms of substantially U-shaped springs 297 and 299, respectively, generally similar to springs 237 and 262. The upper arms of springs 297 and 299 engage pin 268 while the lower arm engages the under side of the hubs of levers 182 and 184, respectively, to retain said levers in adjusted position.

The fourth damper 170 provided in casing section 50 is also actuated by a Bowden cable 300. As shown more particularly in Figure 1, the Bowden cable is connected to an actuating reciprocating rod 302 having a knob 304 mounted at the outer end thereof. Rod 302 is guided for reciprocation in a bracket 306 mounted in any suitable manner on instrument panel 308. The other end of Bowden cable 300 is connected to the crank arm 176 secured to the outer end of the rod 174 attached to valve 170. Accordingly, upon actuation of rod 302 inwardly, valve 170 will be swung to open position, and upon actuation of said rod outwardly said valve will be actuated to the closed position shown in Figure 4.

Figure 11:
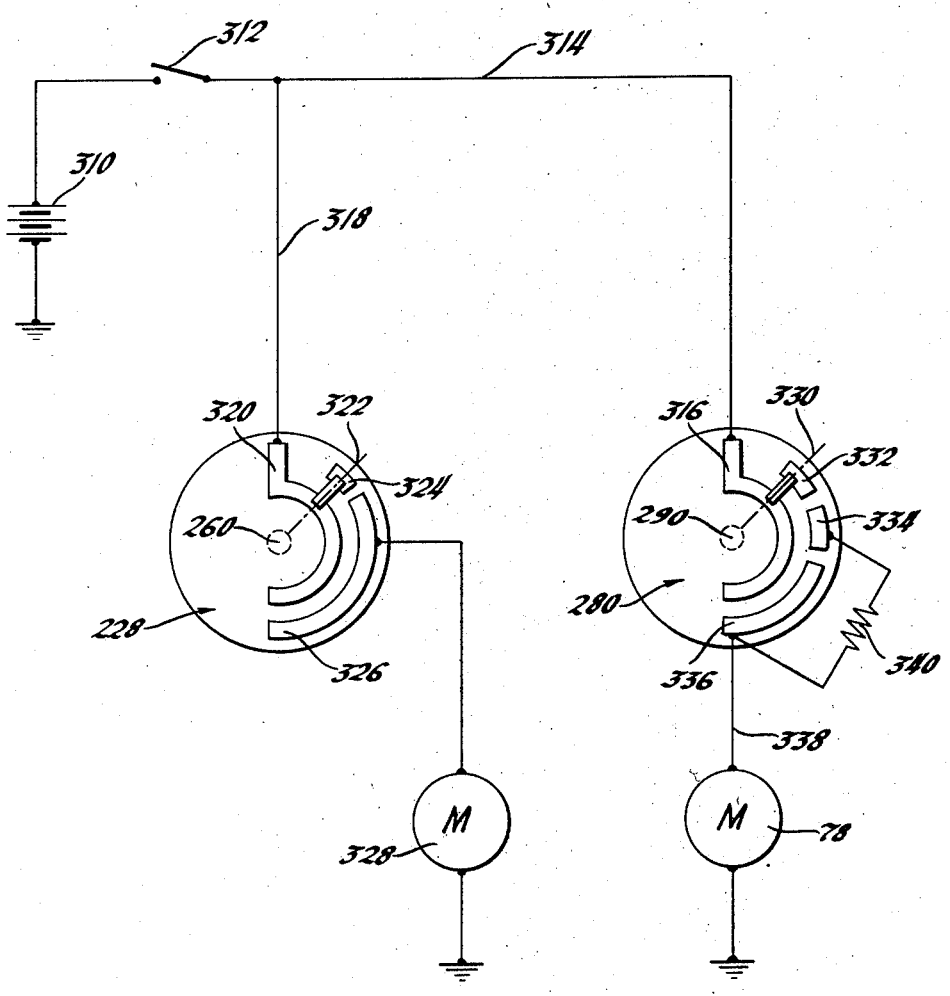
Figure 11 is a wiring diagram showing the control means for the blower motors associated with the apparatus.

Referring to Figure 11, a source of electric potential such as a storage battery 310 is connected at one end to ground and at the other end to an ignition switch 312. A conductor 314 is connected at one end to a fixed contact 316 of switch 280 and by a branch conductor 318 connects conductor 314 to a fixed contact 320 of switch 228. A movable bridging contact 322 is secured to shaft 260 of switch 228 and is adapted to connect contact 320 with fixed contacts 324 and 326, respectively. Fixed contact 326 is connected to the blower electric motor 328 for the rear heating unit 20, said motor in turn being connected to ground. Shaft 290 of switch 280 also has secured thereto a movable bridging contact 330 adapted to connect contact 316 with fixed contacts 332, 334, and 336, respectively. Contact 336 is connected to blower motor 78 by a conductor 338, the said blower motor in turn being connected to ground. A resistance coil 340 is connected at its opposite ends to fixed contact 336 and 334.

From the foregoing description it is believed that the operation of improved heating, ventilating, and windshield defrosting apparatus is clear. However, in order to correlate the various elements thereof, a brief resumé of the operation of the apparatus as a whole will now be given. When the control levers 178, 180, 182 and 184 are in their uppermost position of adjustment, as shown in Figure 2, the various control valves of the apparatus as well as the blower motors associated with the front and rear heating units are de-energized. Supposing now it should be desired to increase the heat in the passenger compartment 6 of the vehicle. The operator engages lever 180 and actuates the latter to a position substantially midway between the upper and lower ends of the guide slot 188. When this occurs, valve 134 will be actuated to open position and at the same time the movable contact 322 of switch 228 will be actuated into engagement with fixed contact 326 thereby energizing the motor 328 associated with the rear heating unit 20. When this occurs, the blower associated with the rear heating unit 20 will cause recirculation of air through the heating core 24 and the air so heated will then be forced rearwardly of the front seat of the vehicle. If the vehicle is in motion there will be a natural circulation of air through ducts 84 and 70, next through the heating core 22 and into the distributor compartment 94 from which it discharges into the vehicle through discharge opening 88. In the event it is desired to increase the heating effect by circulating more heated air through opening 88, lever 182 is moved downwardly to bring movable contact 330 into engagement with fixed contact 334. The current from battery 310 will now flow to motor 78 through resistance coil 340 thereby causing said motor to operate at a moderate speed. Motor 78 now actuates blower 74 causing a greater volume of air to flow through heating core 22 and into the vehicle through opening 88. In the event that additional air is desired to be circulated through the system, lever 182 is actuated downwardly to a greater extent to bring movable contact 330 into contact with fixed contact 336, thereby short circuiting resistance 340 and causing motor 78 to operate at a higher speed. In the event that it is desired to regulate the temperature automatically in the vehicle compartment 6, the operator moves lever 178 downwardly thereby conditioning thermostatically operable valve 30 to operate in the desired manner. By manipulating lever 178 greater or lesser amounts of heating fluid will circulate through valve 30 and thence through the heating cores 24 and 22 associated respectively, with front and rear heating units 18 and 20. In the event that it is desired to circulate unheated air into the vehicle 6, control lever 180 is moved to its uppermost position of adjustment thereby closing valves 134 and 152. Valve 170 is now opened by actuating reciprocating rod 302 inwardly. The air now will by-pass heater 22 and will flow directly into compartment 6 through openings 114 and 90, respectively. Should it be desired also to direct unheated air upwardly against the windshield 126, lever 184 is moved downwardly which causes opening of valve 160. Unheated air may now also flow past valve 160 through openings 86 and discharge against windshield through discharge openings 132. The flow of unheated air flow through opening 114 and past valves 160 may also be regulated by controlling the speed of blower 74. If it is desired that both heated and unheated air enter the vehicle, lever 180 is moved downwardly to adjust dampers 134 and 152 to the desired extent. It therefore is seen that the apparatus comprising the present invention is capable of operation to either temper or otherwise control heating of the air or to circulate the air to meet the most exacting requirements. The air may be heated rapidly if desired. The temperature may also be effectively controlled automatically by the thermostatically controlled valve provided in the system. The vehicle may also be ventilated with fresh unheated air or by tempered air, as desired, by simply manipulating the handily disposed control levers.

While but a single embodiment of the invention has been shown and described herein, it will be apparent to those skilled in the art that other embodiments and changes in detail may be made without departing from the spirit of the invention. It therefore is to be understood that it is not intended to limit the invention to the single embodiment disclosed but only by the scope of the claims which follow.

What is claimed is:

1. In apparatus of the character described, the combination of an outside air heating unit in a vehicle including a casing having an outside air inlet portion and an air distributing portion, said portions having communicating openings, said air distributing portion having a plurality of air discharge openings provided therein, duct means connected to said casing for conducting air discharging from one of said openings for windshield defrosting, a valve for said last mentioned opening, a second of said openings adapted to deliver heated air directly into said vehicle, a second valve for said last mentioned opening, air heating means in the said air inlet portion of said casing for providing said heated air, said air heating means having air passages communicating directly with said air distributing portion and said second valve, operating means for said valves, an instrument panel in said vehicle, a member mounted adjacent said panel for controlling the operation of both of said valves, means forming a passage in said casing by-passing said air heating means and said second opening and adapted to discharge unheated air into said vehicle through a third of said openings in said casing, valve means for controlling the flow of air through said last mentioned opening, means forming a second passage in said casing by-passing said air heating means and adapted to conduct unheated air to said first discharge opening in said casing, a valve for controlling the air flow through said last mentioned passage, and means mounted adjacent said instrument panel for actuating said last mentioned valve to open and closed position.

2. In apparatus of the character described, the combination of an outside air heating unit in a vehicle including a casing having an outside air inlet portion and an air distributing portion, said air distributing portion having a plurality of air discharge openings provided therein, duct means connected to said casing for conducting air discharging from one of said openings for windshield defrosting, a valve for said last mentioned opening, a second of said openings for delivering air directly into said vehicle, a second valve for said last mentioned opening, air heating means in the said air inlet portion of said casing and in alignment with said second valve for heating air before it enters said air distributing portion, operating means for said valves, an instrument panel in said vehicle, a member mounted adjacent said panel for controlling the operation of both of said valves, means forming a passage in said casing by-passing said air heating means and said second opening and adapted to discharge unheated air into said vehicle through a third of said openings in said casing, valve means for controlling the flow of air through said last mentioned opening, means forming a second passage in said casing by-passing said air heating means and adapted to conduct unheated air to said first discharge opening in said casing, a valve for controlling the air flow through said last mentioned passage, means mounted adjacent said instrument panel for actuating said last mentioned valve to open and closed position, thermostatically controlled valve means for controlling the operation of said air heating means, means mounted adjacent said instrument panel for adjusting said last mentioned means, blower means for inducing air flow through said casing, an electric motor for operating said blower means, an adjustable switch for controlling said electric motor, and means mounted adjacent said instrument panel for actuating said switch.

3. Heating, ventilating and windshield defrosting apparatus in a vehicle having a windshield and a fire wall, said apparatus comprising an outside air duct extending from the exterior and front of the vehicle, a casing adjacent said fire wall and connected to said duct, said duct and casing forming a continuous structure passing through said fire wall, a heat exchange core in said structure forward of and next to said fire wall with rearwardly extending air passages for receiving air from said duct, duct means extending from said casing rearward of said core and toward said windshield, an opening in said casing leading rearwardly and in communication with a zone in said casing to the rear of said core, and valves controlling air flow through said duct means and opening whereby air may be directed from said core in a substantially horizontal and rearward direction for heating and ventilating and upwardly through said duct means for defrosting said windshield.

4. Apparatus substantially as described in claim 3 in which the tops of said structure and core define a by-pass passage for outside air, and valve means arranged to control said by-pass passage whereby unheated air may be directed to said duct means and towards said windshield.

5. Apparatus substantially as described in claim 3 in which the top and bottom of said structure cooperate with the top and bottom of said core respectively to define two by-pass passages around said core for outside unheated air, valve means arranged in the top of said casing to control one of said by-pass passages leading to said windshield, and other valve means arranged to control the other by-pass passage for ventilation purposes.

6. Heating, ventilating and windshield defrosting apparatus in a vehicle having a windshield, passenger compartment and a fire wall, said apparatus comprising a casing with an enlarged portion adjacent the said fire wall, an outside air duct leading rearwardly and communicating with said casing to form a continuous structure leading through said fire wall, an opening in said casing leading directly to said compartment, a heat exchange core in said enlarged portion defining air passages in substantial alignment with said air duct and said opening, and a valve arranged to control the passage of air through said opening.

7. In a device of the class described, the combination of a casing having an air inlet end and an air distributing compartment having air discharge openings at different locations thereon, valves for controlling air flow through said discharge openings, a movable member having a plurality of cams thereon, an operating arm for one of said valves, a cam follower on said arm engaging one of said cams, an operating member secured intermediate its ends to another of said valves, a cam follower at each end of said operating member engaging others of said cams, and means for actuating said movable member to various positions of adjustment.

References Cited in the file of this patent
UNITED STATES PATENTS

| | | |
|---|---|---|
| 348,697 | Shenfield et al. | Sept. 7, 1886 |
| 2,009,311 | Ellenberger | July 23, 1935 |
| 2,580,026 | Jacobi | Dec. 25, 1951 |
| 2,605,688 | Hezler | Aug. 5, 1952 |
| 2,612,829 | Joyce | Oct. 7, 1952 |
| 2,627,218 | Katz | Feb. 3, 1953 |
| 2,631,517 | Duhn | Mar. 17, 1953 |
| 2,634,670 | Simons | Apr. 14, 1953 |
| 2,640,407 | Aufiero | June 2, 1953 |
| 2,672,294 | Crockett | Mar. 16, 1954 |
| 2,718,839 | Wilfert | Sept. 27, 1955 |